US012004477B2

(12) United States Patent
Christenson et al.

(10) Patent No.: US 12,004,477 B2
(45) Date of Patent: Jun. 11, 2024

(54) DEVICES AND METHODS FOR MANAGING ANIMALS IN AN ENCLOSURE

(71) Applicant: CTB, Inc., Milford, IN (US)

(72) Inventors: Robert Christenson, Milford, IN (US); James R. Kraft, Milford, IN (US)

(73) Assignee: CTB, Inc., Milford, IN (US)

( * ) Notice: Subject to any disclaimer, the term of this patent is extended or adjusted under 35 U.S.C. 154(b) by 0 days.

(21) Appl. No.: 17/496,672

(22) Filed: Oct. 7, 2021

(65) Prior Publication Data

US 2022/0104450 A1   Apr. 7, 2022

Related U.S. Application Data

(60) Provisional application No. 63/088,962, filed on Oct. 7, 2020.

(51) Int. Cl.
*A01K 1/00* (2006.01)
*A01K 31/18* (2006.01)

(52) U.S. Cl.
CPC .......... *A01K 1/0047* (2013.01); *A01K 31/18* (2013.01); *A01K 2227/30* (2013.01)

(58) Field of Classification Search
CPC ...... A01K 1/00; A01K 1/0035; A01K 1/0047; A01K 31/18; A01K 31/20; A01K 31/002; A01K 31/005; A01K 2227/30
See application file for complete search history.

(56) References Cited

U.S. PATENT DOCUMENTS

| | | | | |
|---|---|---|---|---|
| 2012/0004517 | A1* | 1/2012 | Starr | A61B 5/02255 600/301 |
| 2012/0125264 | A1* | 5/2012 | Veng | A01K 29/005 119/416 |
| 2013/0029573 | A1* | 1/2013 | Heemskerk | A22C 21/00 452/57 |
| 2014/0058567 | A1* | 2/2014 | Matsuoka | G05D 23/1917 700/276 |

OTHER PUBLICATIONS

International Search Report and Written Opinon of the International Searching Authority for PCT/US21/54042 dated Dec. 28, 2021.

* cited by examiner

*Primary Examiner* — Monica L Perry
*Assistant Examiner* — Aaron M Rodziwicz
(74) *Attorney, Agent, or Firm* — Clark Hill PLC

(57) ABSTRACT

The invention comprises systems and methods for controlling environmental conditions within and/or around an animal enclosure. The systems and methods preferably comprise a climate control system and infrared sensors in a poultry house having a first climate and housing poultry having one or more measurable parameters such a temperature. The infrared sensors detect infrared light information emitted by a head and/or vent of poultry in the house. The climate control system processes the information to calculate an internal temperature of poultry and activates one or more climate conditioning devices in the house to change the first climate to a second climate determined by the detected information and/or calculated internal temperatures of the poultry. The systems and methods may be deployed in houses comprising thousands of poultry and one or more climate zones. The systems and methods may make one or more climate changes based on one or more different parameters.

16 Claims, 2 Drawing Sheets

DEVICES AND METHODS FOR MANAGING ANIMALS IN AN ENCLOSURE

CROSS-REFERENCE TO RELATED APPLICATIONS

This application claims the priority benefit of U.S. Provisional Patent Application No. 63/088,962 filed on Oct. 7, 2020.

FIELD OF THE INVENTION

The present invention generally relates to climate control systems for use in connection with animal husbandry, such as poultry farming. More specifically, the present invention is a climate control system for use in an animal enclosure, such as a poultry house, wherein the system comprises one or more sensors used to detect an animal temperature and provide for climate control changes in or around the enclosure.

BACKGROUND OF THE INVENTION

The overall comfort of poultry in a poultry house is important, not only for the overall well-being of the poultry as it is raised, but also with respect to poultry yield. It is well-known that poultry maintained in a suitable climate can reduce poultry losses and associated costs, while increasing poultry productivity. Climate control systems of the prior art fail to provide reliable and cost-effective climate control in an animal enclosure, wherein real-time information about the animals therein may be detected and used to cause desired changes to the system and consequently the climate in the enclosure. Prior art systems merely measure ambient air temperatures, relative humidity, and air speed to approximate the temperature and comfort levels of animals within an animal enclosure. Moreover, although systems of the prior art may be used to keep an enclosure climate at a designated temperature and/or humidity, such systems do not take into account the actual body temperature of animals within the enclosure when changes to the enclosure climate are made. Accordingly, there exists an unmet need in the art for improved climate control systems used to better manage the climate and animal comfort within animal enclosures.

SUMMARY OF THE DISCLOSURE

A preferred embodiment of the present invention is an animal environment control system comprising an animal enclosure, animals within the enclosure, and a climate control system. The enclosure is preferably a poultry house or similar structure, although the enclosure may be any structure or environment where animals are housed and there is a need or desire to control the climate of the enclosure. The climate control system preferably comprises one or more infrared sensors, a receiver, a processor, a transmitter, an interface, and a climate conditioning device. The processor preferably comprises an algorithm. The animals preferably comprise a measurable parameter, such as a vital sign or other feature of the animal, such as weight, height, color, sex, animal type, etc. The climate conditioning device is preferably a heater, air conditioner, humidifier, dehumidifier, or air mixer.

An alternative embodiment of the present invention is a method for controlling an animal environment, the method comprising the steps of: (i) providing an animal enclosure; (ii) providing animals within the animal enclosure, wherein the animal comprises one or more measurable parameters; (iii) providing a climate control system within and/or operatively connected to the enclosure, wherein the climate control system comprises an infrared sensor, a computer, and a climate conditioning device; (iv) using the climate control system to detect a first climate of the enclosure, detect the parameter of the animal, relay information comprising the parameter to the computer, and optionally activate the climate conditioning device to provide a second climate of the enclosure.

Another alternative embodiment of the present invention comprises:

A system for controlling environmental conditions within and/or around an animal enclosure, the system comprising:
an animal enclosure having a first climate;
a climate control system connected to the animal enclosure and comprising a climate conditioning device and a processor;
one or more sensors connected to the climate control system and disposed within and/or around the animal enclosure;
wherein the animal enclosure is configured to house one or more animals each having a one or more detectable parameters or measurable features;
wherein the one or more sensors are configured to detect the one or more parameters or measurable features and convey information about the one or more parameters or measurable features to the processor;
wherein the processor is configured to cause the climate conditioning device to change the first climate to a determined second climate in the animal enclosure; and
wherein the determined second climate is determined using calculations of the processor that are based on the one or more parameters or measurable features detected by the one or more sensors.

Another alternative embodiment of the present invention comprises:

A method for controlling environmental conditions within and/or around an animal enclosure, the method comprising the steps of:
providing an animal enclosure having a first climate and being configured to house one or more animals each having one or more detectable parameters or measurable features;
providing a climate control system connected to the animal enclosure and comprising a climate conditioning device and a processor;
providing one or more sensors connected to the climate control system and disposed within and/or around the animal enclosure;
detecting and measuring via the one or more sensors the one or more detectable parameters or measurable features;
transmitting via a transmitter information comprising the one or more detectable parameters or measurable features to the processor;
calculating via the processor a determined second climate based the information; and
activating the climate conditioning device to change the first climate to the determined second climate in the animal enclosure.

Preferred embodiments of the present invention enable greater control and accuracy for climate environments in large poultry houses, where often thousands of animals may be housed at once. Each animal may benefit (i.e., be healthier and more productive for poultry farmers) from a tailored and real-time climate environment suited to the animals.

DETAILED DESCRIPTION OF AN EMBODIMENT OF THE INVENTION

While the present invention may be susceptible to embodiment in different forms, there is described herein in detail, a specific embodiment with the understanding that the present disclosure is to be considered an exemplification of the principles of the invention, and is not intended to limit the invention to that described herein.

Figure 1:
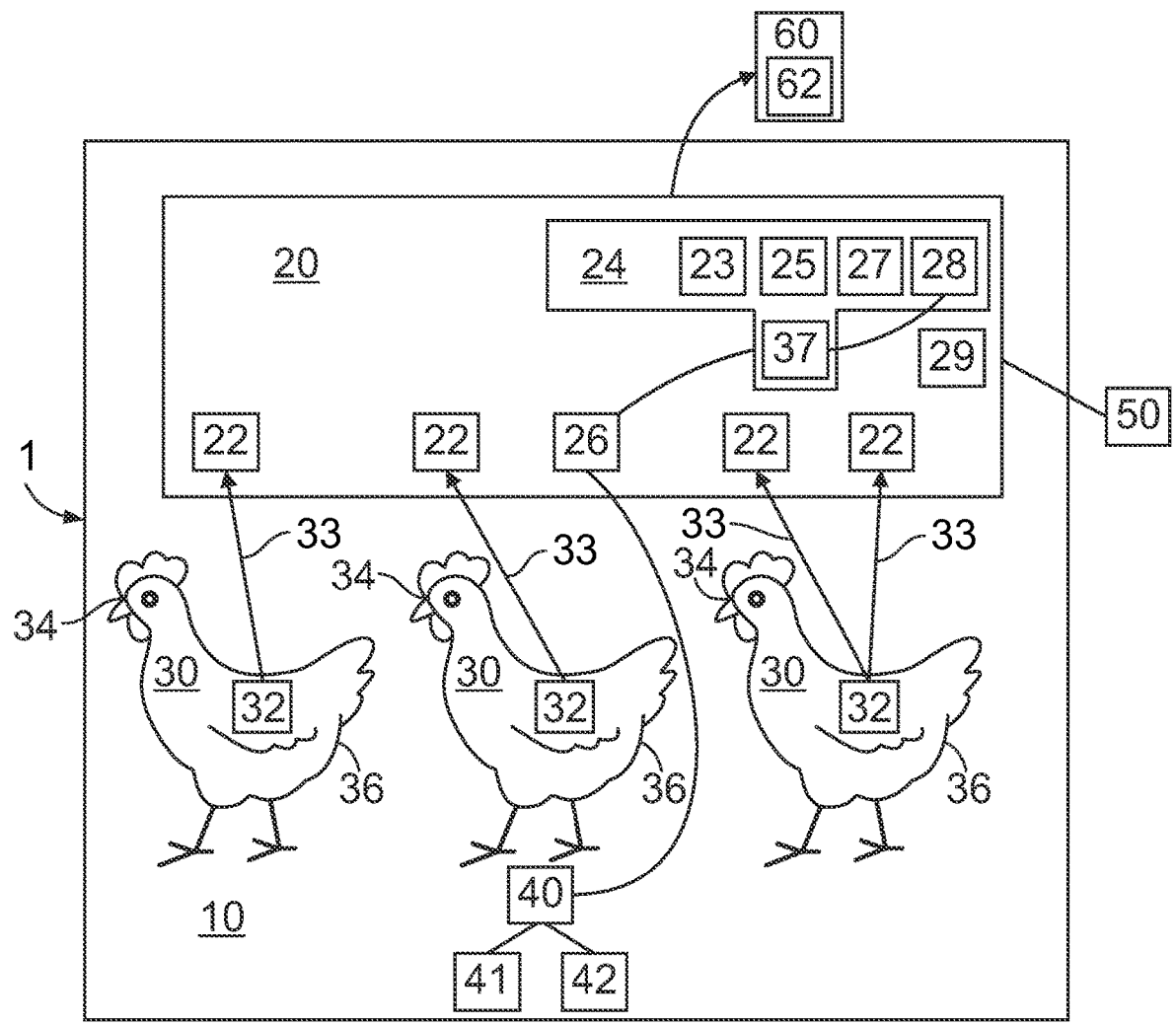
FIG. 1 shows a schematic diagram of an animal environment control system provided in accordance with a preferred embodiment of the present invention.

As shown in FIG. 1, a preferred embodiment of the present invention is a system 1 comprising: an animal enclosure 10, climate control system 20, animals 30 each comprising one or more measurable parameters 32 and being housed within or around the enclosure 10, and an enclosure climate 40.

The animal enclosure 10 may be any suitable enclosure for housing animals, such a poultry house located on a poultry farm. In a preferred embodiment, the enclosure climate 40 within the enclosure 10 is controlled. The enclosure 10 may be completely enclosed or partially enclosed and partially open to an outdoor environment.

The climate control system 20 preferably comprises one or more sensors 22, a processor 24, and a climate conditioning device 26. The sensors 22 may be infrared sensors suitable for detection of a parameter 32. An example of a suitable sensor 22 is a Flir® Lepton 3.5 for infrared detection of a temperature parameter 32. The processor 24 may comprise a receiver 25, transmitter 23, memory 27, algorithm 28, and user interface 29. The user interface 29 may also be external to the processor 24. The climate control system 20 may be connected to a remote control device 60 and/or remote user interface 62, such as a smartphone or similar device. The climate conditioning device 26 may be any device or combination of devices suitable for use in controlling the enclosure climate 40, such as a heater, air conditioner, humidifier, dehumidifier, or air mixer.

The animals 30 may be any animal suitable for housing within or around the enclosure 10, such as poultry. The parameter 32 may be any indication suitable for detection by the sensor 22 or similar device. The parameter 32 may be a vital sign, such as body temperature, pulse rate, respiration rate, blood pressure, weight, or height. In a preferred embodiment of system 1, the parameter 32 is a body temperature of the animal 30.

In operation, system 1 comprises the enclosure 10, such as a poultry house, where the animals 30, such as poultry, are housed. Climate control system 20 may be used to detect a first climate 41 within the enclosure 10. Sensors 22 may be used to detect a parameter 32 of the poultry 30. For example, wherein sensors 22 are infrared temperature detectors, such sensors 22 may be used to detect a temperature 32 of the poultry 30. One or more sensors 22 may be deployed in control system 20 for this purpose, particularly because poultry houses 10 may be quite large and house thousands of chickens 30. Further system 1 may comprise a plurality of isolated or interconnected climate control systems 20 in and around a plurality of enclosures 10 comprising system 1.

In a preferred embodiment, one or more infrared sensors 22 detect the temperature 32 of the poultry 30 via infrared radiation 33 or parameter signal 33 preferably emitted by the head 34 and/or vent 36 of the poultry 30. Temperature 32 measurements taken at the head 34 and/or vent 36 of poultry 30 closely correlate to an internal temperature of the poultry 30.

Infrared technology, such as sensors 22, can be used to read the temperature 32 of the birds 30 and the temperature of the climate 40 surrounding the birds 30. This information can be used, sometimes in combination with other data, to determine: (1) an internal bird temperature 37; a difference between bird 30 temperature 32 and climate 40 temperature; (3) a difference between internal bird temperature 37 and climate 40 temperature; (4) bird 30 height 32; and/or (5) bird 30 position (i.e., within enclosure 10).

Temperature 32 data is provided to the processor 24, which in turn comprises algorithm 28 used to process the data and make consequent changes to the enclosure climate 40, such as a change from a first climate 41 to a second climate 42. Changes may include changes to climate temperature, ventilation, humidity, and/or air flow. Changes are typically effectuated via climate conditioning device 26.

The detection of parameter 32 and the consequent changes to climate 40 may be made in real-time or set according to a preferred schedule. Moreover, changes to climate 40 made in view of measured parameters 32 that fluctuate by a predetermined range or tolerance, such as +/−2 degrees Fahrenheit. Moreover, processor 24 is configured to process myriad parameter 32 measurements of thousands of poultry 30 at the same time.

Amendments to the enclosure climate 40 may be localized within one or more portions of the enclosure 10, such as a hot or cold area, or the changes may be universal throughout the enclosure 10.

The climate control system 20 may comprise wired and/or wireless connections, and such a system 20 will typically further comprise a power source 50.

Ancillary uses for system 1 include detection of bird 30 height 32 and/or location within the enclosure 10. In that way, system 1 may be used to properly position and/or amend the height of equipment, such as feeders and drinkers, in the enclosure 10 to better accommodate birds 30.

Animals, such as poultry, are often sensitive to changes in temperature of their enclosure climate. For example, a single hot day on a farm can significantly increase the internal bird temperature of poultry, thus requiring amendments to enclosure climates to maintain the health and comfort of the birds. However, prior art determinations of enclosure climates cannot be readily correlated to the actual internal bird temperatures, and over successive days of hot weather, particularly where corresponding nights remain quite warm (thus reducing the overnight cooling off of the birds), the temperatures of the birds can continue to rise to unhealthy levels that cause severe discomfort or even death.

Accordingly, system 1 may be used to enhance the detection and control of internal bird temperatures 37 via the system 1 and method 100 described herein.

Figure 2:
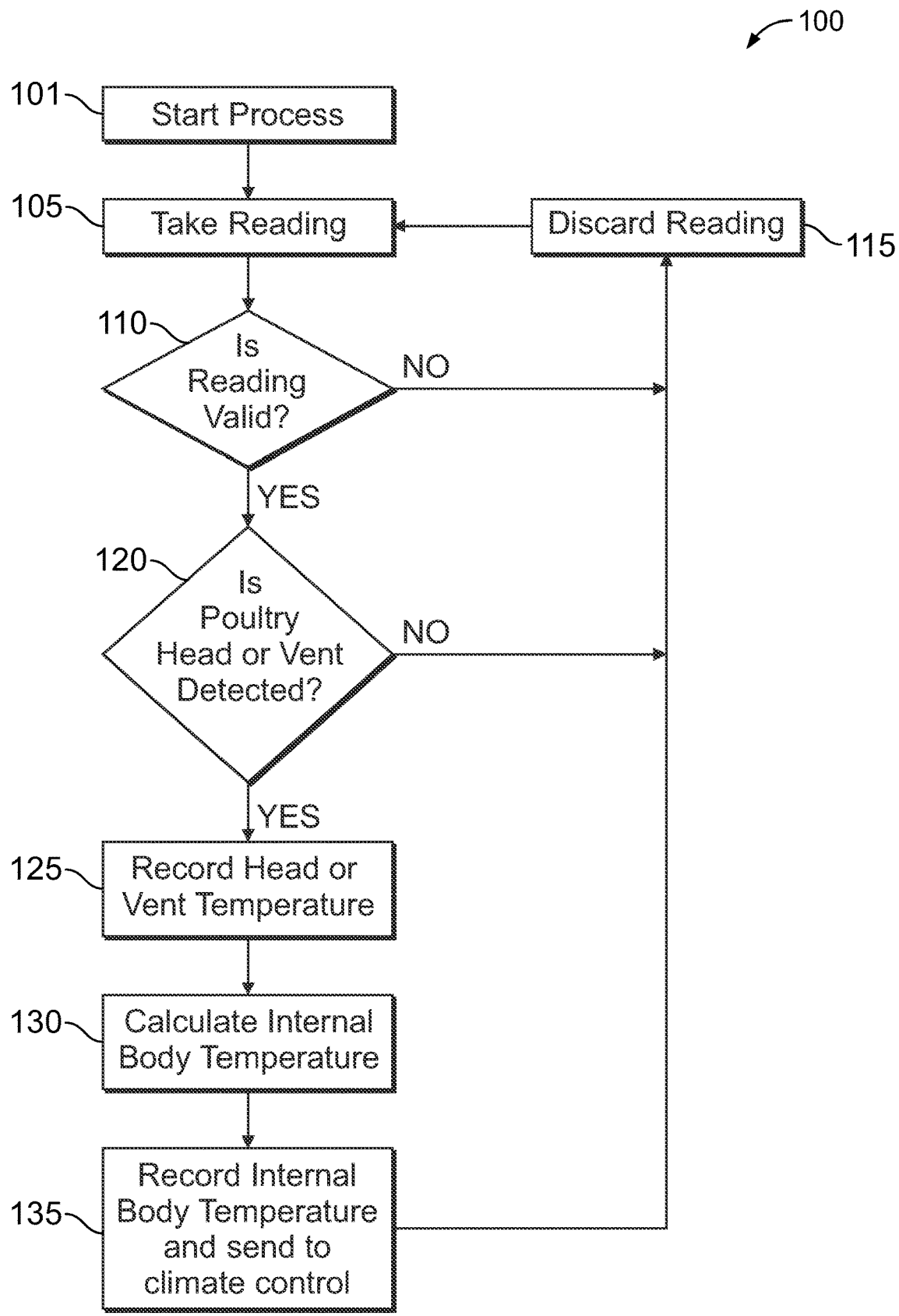
FIG. 2 shows a flow chart for detection of an animal parameter used to affect climate changes in an animal enclosure provided in accordance with a preferred embodiment of the present invention.

As shown in FIG. 2, a method 100 optionally comprising algorithm 28 for controlling an enclosure climate 40 of an animal enclosure 10 is as follows: (i) initiate a climate control process in an animal enclosure 10 at step 101, including detection of a first climate 41 via climate control system 20; (ii) measure a parameter 32 of an animal 30 using system 20 comprising sensors 22 at step 105; (iii) determine whether the parameter 32 reading is valid at step 110, wherein if it is invalid proceed to step 115 or if it is valid proceed to step 120; (iv) determine whether the bird's 30 head 34 or vent 36 is detected at step 120, and if such is not detected proceed to step 115, whereas if such is detected proceed to step 125; (v) record a head 34 or vent 36 temperature at step 125, such as in memory 27; (vi) calculate an internal bird temperature 37 using the measurements of step 125 at step 130; and (vii) record the temperature 37 and cause changes to the enclosure climate 40 via climate conditioning device 26, including amendments from first climate 41 to second climate 42, at step 135.

Software may be used to control the system 1 and develop algorithm 28 to provide for: (i) reporting/recording a temperatures 37, including a minimum temperature 37 and maximum temperature 37 and the time of day it occurred; (ii) reporting/recording the temperature 37, suggesting changes to system 1, showing changes vs. the previous day; (iii) optionally making climate 40 decisions and enhancing machine learning; and (iv) providing machine learning and adding functionality to the system 1. The foregoing may also be provided for climates 40, 41, 42 and parameters thereof including temperature, humidity, ventilation, air flow, etc., as well as parameters 37 other than temperature as described more fully above.

The system 1 and method 100 may further comprise features and steps to provide for the implementation and/or use in multiple areas or zones of the poultry house 1. For example, a first set of sensors 22 may detect a first set of one or more parameters or measurable features 32 of a first subset of all animals 30 in the house 1, while a second set of sensors 22 may detect a second set of one or more parameters or measurable features 32 of a second subset of all animals 30 in the house 1. In such cases, system 1 and method 100 may be adapted to provide changes in different portions of the house 1 from a first climate to a second climate or a third climate, depending on determinations made in view of the first and second sets of parameters. Moreover, the system 1 may comprise multiple climate control systems 20 in the house 1. The system 1 is also configured to detect one or more parameters or measurable features 32 of the same animal 30 at the same time or at different times, one or more parameters or measurable features 32 of a plurality of animals 30 at the same time or at different times, as the case may be.

While a specific embodiment of the invention has been shown and described, it is envisioned that those skilled in the art may devise various modifications without departing from the spirit and scope of the present invention.

The invention claimed is:

1. A system for controlling environmental conditions within and/or around poultry enclosure, the system comprising:
    a poultry enclosure having a first climate;
    a climate control system connected to the poultry enclosure and comprising a climate conditioning device and a processor;
    one or more sensors connected to the climate control system and disposed within and/or around the poultry enclosure;
    wherein the poultry enclosure is configured to house one or more poultry each having a one or more detectable parameters or measurable features;
    wherein the one or more sensors are configured to detect the one or more parameters or measurable features and convey information about the one or more parameters or measurable features to the processor;
    wherein the processor is configured to cause the climate conditioning device to change the first climate to a determined second climate in and/or around the poultry enclosure; and
    wherein the determined second climate is determined using calculations of the processor that are based on the one or more parameters or measurable features detected by the one or more sensors; and
    wherein the calculations comprise an internal temperature of the one or more poultry that corresponds to the determined second climate.

2. The system of claim 1, wherein the poultry enclosure is a poultry house.

3. The system of claim 1, wherein the climate conditioning device comprises one or more of a heater, an air conditioner, a humidifier, a dehumidifier, and an air mixer.

4. The system of claim 1, wherein the processor comprises one or more of a receiver, a transmitter, a memory, an algorithm, and a user interface.

5. The system of claim 1, wherein the one or more sensors are infrared sensors.

6. The system of claim 5, wherein the poultry enclosure houses one or more poultry each having a head and a vent, and wherein the one or more parameters or measurable features is a temperature that corresponds to infrared light emitted from the vent of at least one of the poultry.

7. The system of claim 6, wherein the poultry enclosure is a poultry house.

8. The system of claim 7, wherein the determined second climate is determined using an algorithm.

9. The system of claim 6, further comprising the poultry enclosure being configured to house a plurality of poultry each having a plurality of parameters or measurable features, wherein the plurality of parameters or measureable features comprises a temperature that corresponds to infrared light emitted from the head of at least one of the plurality of poultry.

10. The system of claim 1, wherein the one or more parameters or measurable features is at least one of a temperature, pulse rate, a respiration rate, a blood pressure, a weight, or a height.

11. A method for controlling environmental conditions within and/or around a poultry enclosure, the method comprising the steps of:
    providing a poultry enclosure having a first climate and being configured to house one or more at poultry each having one or more detectable parameters or measurable features;
    providing a climate control system connected to the poultry enclosure and comprising a climate conditioning device and a processor;
    providing one or more sensors connected to the climate control system and disposed within and/or around the poultry enclosure;
    detecting and measuring via the one or more sensors the one or more detectable parameters or measurable features;
    transmitting via a transmitter information comprising the one or more detectable parameters or measurable features to the processor;
    calculating via the processor an internal temperature of the one or more poultry that is based the information and that corresponds to a determined second climate determined by the processor; and activating the climate conditioning device to change the first climate to the determined second climate in and/or around the poultry enclosure.

12. The method of claim 11, wherein the one or more sensors are infrared sensors.

13. The method of claim 12, wherein the poultry enclosure houses one or more poultry each having ahead and a vent, and the method further comprising the step of detecting and measuring via the infrared sensors the one or more parameters or measurable features at the vent of the one or more poultry, wherein the one or more parameters or measurable features is a temperature that corresponds to infrared light emitted from the vent of the one or more poultry.

14. The method of claim 13, wherein the animal enclosure is a poultry house.

15. The method of claim 1, wherein the poultry enclosure houses one or more poultry each having a head and a vent, and further comprising the step of detecting and measuring via the sensors the one or more parameters or measurable features at the head or vent of the one or more poultry, and further comprising the step of calculating the internal temperature by omitting from the step of calculating via the processor all of the one or more detectable parameters or measurable features that were not detected at the head or vent.

16. The method of claim 11, wherein the determined second climate is determined by the processor using an algorithm.

* * * * *